United States Statutory Invention Registration [19]

[11] Reg. Number: H698

Thomas, Sr. [43] Published: Nov. 7, 1989

[54] SUBMUNITION FUSE

[75] Inventor: Terry E. Thomas, Sr., Forest Hill, Md.

[73] Assignee: The United States of America as represented by the Secretary of the Army, Washington, D.C.

[21] Appl. No.: 379,024

[22] Filed: Jul. 10, 1989

[51] Int. Cl.[4] ..... F42C 15/22; F42B 13/50

[52] U.S. Cl. ..... 102/245; 102/237; 102/393; 102/489

*Primary Examiner*—David H. Brown

*Attorney, Agent, or Firm*—Anthony T. Lane; Edward Goldberg; Edward F. Costigan

[57] ABSTRACT

A plurality of submunitions packed in a projectile deliver an incapacitating gas payload at far range from the projectile launch site only after the submunitions have been properly ejected and after each submunition has been properly armed. A non-ground-impact type fuse detonates each submunition.

11 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

SUBMUNITION FUSE

BACKGROUND OF THE INVENTION

1. Field of the Invention

This invention generally relates to a fuze for a submunition loaded with a solid pyrotechnic chemical main charge which, when burned, produces an incapacitating gas and, more particularly, to the reliable delivery of the gas to, and the saturation of, a restricted area at far range from the launch point of a projectile in which the submunition is contained.

2. Description of Related Art

In many applications, e.g. tear gas for riot control or chemical warfare, it is desirable to deny access of a certain area to unauthorized persons or enemy forces. For this purpose, an incapacitating gas is used to saturate the restricted area. It has been proposed to load a solid pyrotechnic chemical main charge in each of a plurality of submunitions, all of which are loaded in a launch projectile, for example, a 155 mm projectile fired from a gun or howitzer. The projectile is typically launched at a far range from the restricted area, primarily to protect launch personnel from the incapacitating effects of the gas which might occur if there is a firing malfunction or if prevailing winds blow the gas back to the launch site.

It has been proposed to use impact-type fuzes to detonate explosive primers which, in turn, burn the chemical main charge, thereby initiating a chemical reaction that produces the incapacitating gas. However, such impact-type fuzes do not disperse the incapacitating gas as well as an above-ground release. Also, the existing impact-type fuzes are expensive to produce and somewhat bulky. Ground impact fuzes will misfire if they land on a soft target area, thereby subjecting friendly forces to armed, dud-fired, chemical munitions when the target area is re-taken.

SUMMARY OF THE INVENTION

1. Objects of the Invention

It is a general object of this invention to advance the state of the art of submunition fuzes, particularly submunition fuzes used for delivering an incapacitating gas to a restricted area.

It is another object of this invention to produce a reliable incapacitating gas delivery system which is safe to launch personnel.

Another object of this invention is to provide a fuze operative for initiating the chemical reaction that produces the incapacitating gas while the submunition is still in the air, for better dispersion of the gas and for providing a high degree of reliability on both soft and hard targets.

A further object of this invention is to provide a fail-safe fuze for reliably igniting and burning a solid chemical charge at far range well away from the launch site.

Still another object of this invention is to provide a submunition fuze which is inexpensive to produce.

2. Features of the Invention

In keeping with these objects, and others which will become apparent hereinafter, one feature of this invention resides, briefly stated, in a fuze for a submunition of the type subjected to spinning and air turbulence after launch of a projectile containing the submunition. In a preferred embodiment, a multitude of such submunitions are stacked and loaded into a projectile containing the submunitions.

This invention comprises a submunition housing, preferably of wedge-shaped design, having a compartment containing a solid pyrotechnic chemical main charge. When burned, the main charge produces a gas capable of incapacitating humans and animals. A percussion-type firing pin is mounted on the housing for movement in a longitudinal direction along an axis from a latched to a released position. Biasing means, e.g. a first coil spring, is operative for constantly urging the firing pin along the longitudinal direction from the latched to the released position. Latch means, e.g. a restraining handle, is operative for engaging and maintaining the firing pin in the latched position.

The invention still further comprises a slider having a chamber containing a percussion primer. The chamber has an access port through which the primer is accessible for impact with the firing pin. The chamber also has an exit port in open communication with the compartment containing the main charge. The slider is mounted on the housing for displacement in a transverse direction generally perpendicular to the longitudinal direction between offset and aligned positions in which the access port is respectively offset from and aligned with the axis.

Displacing means, e.g. a second coil spring, is operative for constantly displacing the slider along the transverse direction to the offset position against centrifugal forces generated during said spinning until such centrifugal forces reach a predetermined threshold, e.g. 700 rpm of spin, sufficient to displace the slider to the aligned position. Locking means, advantageously including a spring-loaded lock, is operative for locking the slider in the aligned position.

After projectile launch and after each submunition is expelled from the projectile, the air turbulence surrounding each submunition and the spin imparted to each submunition during launch cooperate to remove the aforementioned restraining handle, thereby releasing the firing pin from its latched position. The biasing means is now enabled to urge the released firing pin through the access port and into striking contact with the primer in the aligned position of the locked slider. This striking contact detonates the primer and directs a flame through the exit port to burn the main charge in the compartment. The resulting incapacitating gas is discharged through a discharge port provided on the housing. The gas saturates an area, access to which is to be denied, at a far range from the projectile launch site.

The above-described fuze is normally unarmed, since the firing pin is normally restrained in the latched position, and the primer is normally urged out of the path of movement of the firing pin. In order for the primer to be moved into the path of travel of the firing pin, the projectile must, first of all, be launched and, secondly, the submunition must be imparted with a spin of at least 700 rpm. Since air turbulence and centrifugal forces are affirmatively used to release the firing pin, the submunitions must be expelled from the projectile and dispersed. All of these factors mitigate against the discharge of the incapacitating gas in the proximity of the launch site, thereby maximizing safety for launch personnel.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENT

Figure 1:
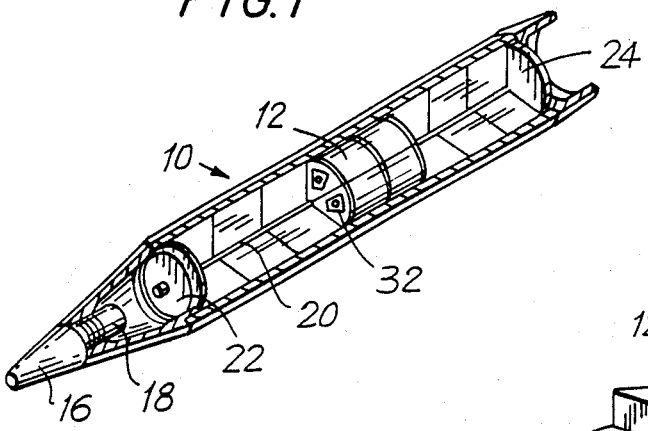
FIG. 1 is a cut-away perspective view of a projectile containing a plurality of submunitions, each detonated by a fuze according to the present invention.
Figure 2:
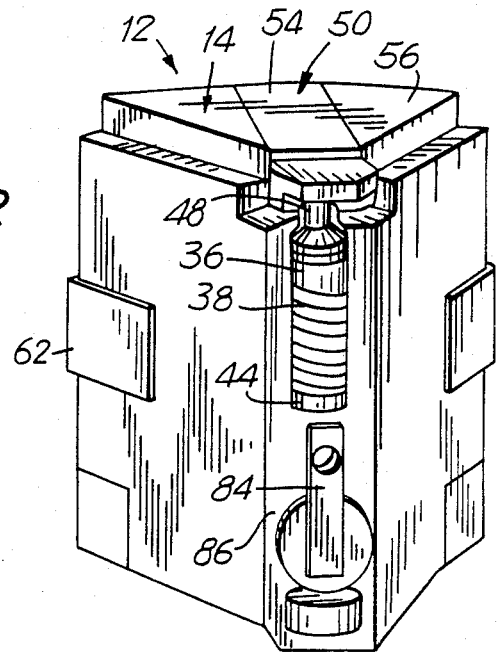
FIG. 2 is a front perspective view of one such submunition prior to being loaded into the projectile.
Figure 3:
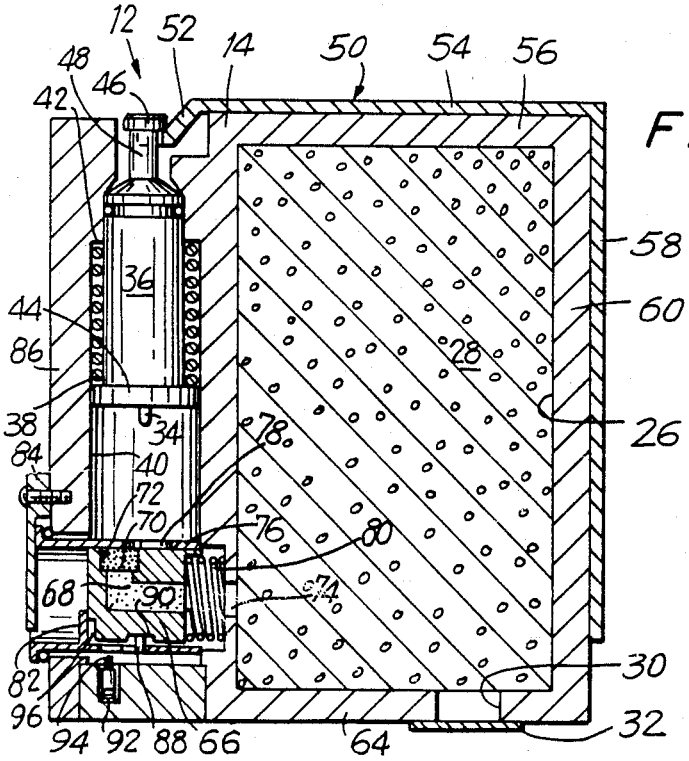
FIG. 3 is a sectional view of a submunition according to this invention, in an unarmed position.

Referring now to FIG. 1, reference numeral 10 generally identifies a streamlined launch projectile. In the preferred embodiment, the projectile 10 is dimensioned so as to be launched from a 155 mm gun or howitzer. A plurality of submunitions, a representative one of which is identified by reference numeral 12 in FIGS. 2 and 3, are loaded into the projectile. Each submunition 12 has a wedge-shaped housing 14 which subtends an angle of about 60° as seen in top plan view. Six of these submunitions are arranged in an annulus or ring-shaped tier resembling a circular pie cut into six equal sectors. Eight of these tiers are stacked, one immediately behind another, lengthwise of the projectile. Hence, the loaded projectile, in the preferred embodiment, has forty-eight identical submunitions 12 stacked in mutual close contact.

Returning to FIG. 1, an expelling fuze 16 is located at the nose of the projectile. An expelling charge 18 is located rearwardly of the expelling fuze 16. A relatively heavy flight-stabilizing center core rod 20 extends through the center of the stacked tiers of submunitions. A front pusher plate 22 is mounted at a front end of the rod 20 above the stacked submunitions. A rear end plate 24 is mounted at a rear end of the rod 20 below the stacked submunitions. The plates 22, 24 with the stacked submunitions therebetween form a closely packed assembly which, together with the core rod, is inserted as a unit into the main body of the projectile. The end plate has shear pins which engage the outer casing of the projectile 10 in order to maintain the interior components in place.

In a conventional manner, a load of gunpowder or the like is loaded into a gun barrel formed with interior rifling, after the projectile 10 was loaded into the barrel. The projectile is launched by the explosion of the gunpowder. The rifling imparts a spin to the projectile. At a predetermined time after launch, the expelling fuze 16 ignites the expelling charge 18, and the resulting detonation gases force the pusher plate 22 and, in turn, all of the submunitions 12, the core rod 20 and the end plate 24 out through the back end of the projectile. The force of the explosion shears the aforementioned shear pins. The spin imparted to the projectile 10 combined with the air turbulence causes the expelled submunitions to also spin and to disperse outwardly away from the center core rod. As explained below, this spin and air turbulence will be affirmatively used to actuate each submunition, which is in direct contrast to the prior art submunitions which are actuated upon impact with the ground.

Turning now to FIG. 3, each submunition housing 14 has a compartment 26 which contains a solid pyrotechnic chemical main charge 28. When burned, the main charge produces an incapacitating gas. A discharge port 30 is provided on the housing and communicates with the compartment 26. The discharge port 30 is normally covered by a rupturable foil, preferably a tin foil 32, to maintain the main charge within the compartment 26. During burning of the main charge, the foil 32 ruptures and permits discharge of the gas.

A percussion-type firing pin 34 is mounted on the housing 14 for sliding movement in a longitudinal direction along an axis from a latched to a released position. The pin 34 is of one piece with a cylindrical shaft 36 around the exterior of which a first coil spring 38 is located. The spring 38 is lodged in a longitudinal channel 40, and has one coil end in abutment with an end wall 42 of the channel 40. The opposite end of the spring 38 bears against an enlarged flange 44 located between the pin 34 and the shaft 36. The spring 38 is under tension in the latched position, and is operative for constantly urging the pin 34 along the longitudinal direction from the latched to the released position.

At the end of the shaft 36 away from the pin 34, an enlarged head 46 is connected to the rear of the shaft 36 by a cylindrical post 48.

A restraining handle 50 is operative for engaging and maintaining the pin 34 in the latched position, as illustrated in FIG. 3. The handle 50 includes a bifurcated hook 52 which engages underneath the head 46 and straddles the post 48 in the latched position. The handle 50 includes a first top section 54 mounted on, and extending over, a top wall 56 of the housing 14, and a bent second-rear handle section 58 extending at least partly along a rear wall 60 of the housing 14. The restraining handle 50 is maintained in its illustrated position, prior to being loaded into the projectile, by means of a handle restraint or clip 62 (see FIG. 2). The clip 62 resiliently clamps onto and presses the handle section 58 against the rear wall 60 of the housing and affirmatively prevents movement of the firing pin 34 prior to loading the submunition into the projectile. During projectile loading, the clip 62 is removed, and the restraining action of the handle 50 is performed by the other internal components within the projectile. For example, the pusher plate 22 at the uppermost tier of submunitions is pressed tightly against each handle top section 54, thereby fixing the position of each handle 50. For the second tier, a bottom wall 64 of each housing is pressed into contact with a respective handle top section 54 of the submunitions of the second tier, thereby fixing the positions of the handles of the second tier. In turn, the handles of each successive tier are fixed in position by the bottom walls of the submunitions of the adjacent tier of submunitions. The end plate 24 insures that successive tiers are kept tightly packed. It will be understood that once the submunitions separate from one another, there will no longer be any restraint on the handles and, therefore, the firing pins will be released.

A slider 66 has a chamber 68 in which a percussion primer 70 is press-fitted. The chamber has an access port 72 through which an uppermost portion of the primer 70 is exposed for impact with the firing pin 34, and has an exit port 74 in open communication with the compartment 26 containing the main charge 28. The slider 66 is mounted for sliding displacement in a transverse direction generally perpendicular to the longitudinal direction between offset and aligned position in which the primer 70 and the access port 72 are offset from and aligned, respectively, with the axis.

The slider is slidable within a stationary casing 76 extending transversely across the longitudinal channel. The casing 76 has a gate opening 78 in alignment with the firing pin 34. The casing 76 is mounted in a transverse channel, at the rear end of which one end of a coil spring 80 abuts. The opposite end of the coil spring 80 abuts against the slider 66. The spring 80 is under tension, and is operative for constantly displacing the slider 66 along the transverse direction to the illustrated offset position into abutment with an end wall 82 of the casing 76. The casing is kept within the transverse channel by means of a retaining plate 84 removably mounted on a front wall 86 of the housing.

A key or guide post 88 is mounted on the casing, and is received in a transverse guide passage 90 formed in the slider. The guide post and guide passage insure that the slider can only move in the transverse direction.

As previously mentioned, once the submunitions are expelled from the projectile by the force of the detonated expelling charge 18, the submunitions continue to spin and maintain centrifugal force. The maximum spin rate of the projectile 10 is on the order of 15,000–20,000 rpm. When each submunition is imparted a spin of about 700 rpm, thereby insuring that a successful launch has occurred, the resulting centrifugal forces that are generated during such spinning act on the slider 66 to displace the same against the action of the spring 80 to the aligned position. The characteristic of the spring 80 is so selected that, when the centrifugal forces reach a predetermined threshold, the access port 72 with primer 70 are in alignment with the gate opening 78 and the firing pin 34. In the aligned position, a spring-loaded plunger or detent subassembly is used to lock the slider in the aligned position. This locking assembly includes a third coil spring 92 and a plunger 94 constantly biased against the slider and enterable into a locking recess 96 when the slider is in the aligned position.

As previously mentioned, when all the submunitions are expelled from the projectile, each submunition continues to spin and is subjected to air turbulence which cooperate to sling the submunitions outwardly away from the center core rod 20 and separate, thus freeing the handle 50. The centrifugal forces, once they have reached a predetermined threshold, are sufficient to align the primer 70 with the firing pin 34 and to lock the slider 66 in said aligned position. The removal of the handle 50 releases the firing pin, thereby enabling the spring 38 to urge the released pin with great force through the gate opening 78 and the access port 72, and into striking contact with the primer 70 in the aligned position of the locked slider. This striking contact detonates the primer and directs a flame through the exit port 74 to burn the main charge 28 in the compartment 26. The tin foil 32 is ruptured, thereby permitting the resulting incapacitating gas, which is formed as a result of a chemical interaction, to discharge through the discharge port 30. The area to which the projectile has been aimed is thus saturated with the gas at a far range from the projectile launch site. Thus, the main charge of each submunition is reliably delivered to the restricted area and is only detonated at that restricted area. Each submunition can only deliver its payload once the projectile has been properly launched with a spin for each submunition exceeding a predetermined threshold value, and only after the submunitions have been dispersed apart from one another.

The foregoing disclosure and drawings are merely illustrative of the principles of this invention and are not to be interpreted in a limiting sense. I wish it to be understood that I do not desire to be limited to the exact details of construction shown and described because obvious modifications will occur to a person skilled in the art.

It will be understood that each of the elements described above, or two or more together, also may find a useful application in other types of constructions differing from the types described above.

While the invention has been illustrated and described as embodied in a submunition fuze, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A fuze for a submunition subjected to spinning and air turbulence after launch of a projectile containing the submunition, comprising:

(a) a submunition housing having a compartment containing a solid pyrotechnic chemical main charge which, when burned, produces an incapacitating gas;

(b) a percussion-type firing pin mounted in the housing for movement in a longitudinal direction along an axis from a latched to a released position;

(c) biasing means for constantly urging the firing pin along the longitudinal direction from the latched to the released position;

(d) latch means for engaging and maintaining the firing pin in the latched position;

(e) a slider having a chamber containing a percussion primer, said chamber having an access port through which the primer is accessible and an exit port in open communication with the compartment containing the main charge, said slider being mounted on the housing for displacement in a transverse direction generally perpendicular to the longitudinal direction between offset and aligned positions in which the access port is respectively offset from and aligned with the axis;

(f) displacing means for constantly displacing the slider along the transverse direction to the offset position against centrifugal forces generated during said spinning until such centrifugal forces reach a predetermined threshold sufficient to displace the slider to the aligned position;

(g) locking means for locking the slider in the aligned position;

(h) said latch means being further operative for releasing the firing pin when subjected to said spinning and air turbulence to enable the biasing means to urge the released pin through the access port and into striking contact with the primer in the aligned position of the locked slider, thereby detonating the primer and directing a flame through the exit port to burn the main charge in the compartment; and (i) a discharge port on the housing and through which the incapacitating gas is discharged, for saturating an area with the incapacitating gas at far range from the projectile launch site.

2. The fuze as recited in claim 1, wherein the displacing means displaces the slider to the aligned position when the submunition has been subjected to a spin of 700 rpm.

3. The fuze as recited in claim 1, wherein the locking means includes a spring-loaded plunger mounted on the housing, and a recess formed in the slider and lockingly receiving the plunger in the aligned position.

4. The fuze as recited in claim 1; and further comprising a rupturable foil covering the discharge port prior to discharge of the incapacitating gas.

5. The fuze as recited in claim 1, wherein the housing is wedge-shaped, and wherein a plurality of identical wedge-shaped housings are arranged in an annulus to form a tier within the projectile, and wherein a plurality of identical tiers are stacked within the projectile.

6. The fuze as recited in claim 5, wherein six housings are arranged in each tier, and wherein eight tiers are stacked within the projectile.

7. The fuze as recited in claim 1, wherein the firing pin has a trailing head, and wherein the latch means is an elongated restraining handle having a bifurcated hook engaging the head in the latched position, said handle being mounted on and stationarily held against the housing to prevent the hook from becoming disengaged from the head.

8. The fuze as recited in claim 7; and further comprising a safety restraint for pressing the handle against the housing and preventing movement of the firing pin prior to loading the submunition into the projectile.

9. The fuze as recited in claim 1, wherein the firing pin is slidably mounted in a longitudinal channel, and wherein the slider is slidably displaced along a transverse channel; and further comprising a stationary casing extending transversely across the longitudinal channel in the path of movement of the pin, said casing having a gate opening which registers with the access port in the aligned position of the slider.

10. The fuze as recited in claim 9, and further comprising means for guiding the slider along the transverse direction, including a guide key on the slider, and a transverse guide passage formed in the casing and receiving the key in a sliding relationship.

11. The fuze as recited in claim 9, wherein the displacing means is a coil spring; and further comprising a retainer stationarily mounted on the housing and abutting against the casing.

* * * * *